United States Patent
Way

[19]

[11] Patent Number: 5,860,412
[45] Date of Patent: Jan. 19, 1999

[54] KITCHEN VENTILATION DUCT DEGREASING SYSTEM

[76] Inventor: Joseph E. Way, 3039 Benefit Ct., Abingdon, Md. 21009

[21] Appl. No.: 964,805

[22] Filed: Nov. 5, 1997

[51] Int. Cl.[6] .............................. F24C 15/20; B08B 3/02
[52] U.S. Cl. .................. 126/299 E; 96/228; 134/169 R
[58] Field of Search .......................... 126/299 E; 96/228, 96/232, 267; 134/166 R, 166 C, 169 R, 169 C

[56] References Cited

U.S. PATENT DOCUMENTS

| | | | |
|---|---|---|---|
| 2,539,344 | 1/1951 | Carraway | 126/299 E |
| 3,770,061 | 11/1973 | Hall | 169/2 R |
| 3,786,739 | 1/1974 | Wright | 126/299 E |
| 3,802,329 | 4/1974 | Wright | 126/299 E X |
| 4,022,118 | 5/1977 | Vandas | 126/299 E X |
| 4,066,064 | 1/1978 | Vandas | 126/299 E |
| 4,084,947 | 4/1978 | Ear | 126/299 E X |
| 4,085,735 | 4/1978 | Kaufman et al. | 126/299 E |
| 4,259,945 | 4/1981 | Lawson | 126/299 E |
| 4,539,024 | 9/1985 | Stehning et al. | 96/232 |
| 4,990,167 | 2/1991 | Stehning | 96/228 |
| 5,042,457 | 8/1991 | Gallagher et al. | 126/299 E |

FOREIGN PATENT DOCUMENTS

| | | | |
|---|---|---|---|
| 57141 | 4/1985 | Japan | 126/299 E |

*Primary Examiner*—Philip R. Coe
*Attorney, Agent, or Firm*—Peter Gibson

[57] ABSTRACT

A system for degreasing the interior surfaces of kitchen exhaust ventilation ducting includes a number of nozzles connected to piping disposed interiorly and longitudinally to the ducting by a framework. The nozzles are supplied by a high pressure pump through the piping and direct a stream of high velocity fluid against the interior surface of the ducting. Selective operation of the nozzles preferably minimizes pump capacity. Sequencing of selective nozzle operation from top to bottom preferably produces a rolling cascade of high velocity fluid directed against the interior surface of the ducting. The resulting effluent is readily collected from the lower end of the ducting and disposed of in any manner desired.

15 Claims, 3 Drawing Sheets

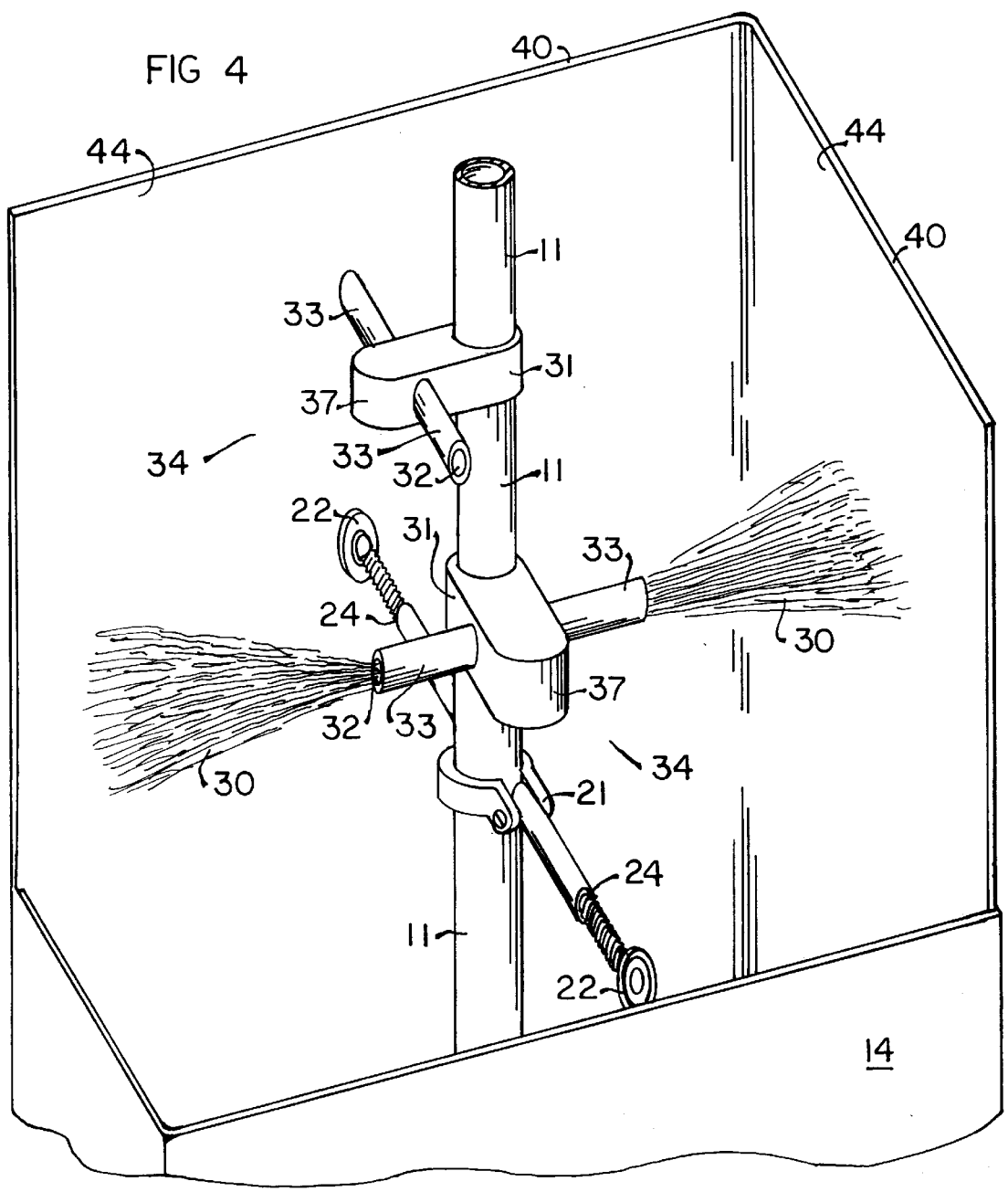

KITCHEN VENTILATION DUCT DEGREASING SYSTEM

BACKGROUND OF THE INVENTION

1. Field of the Invention

The present invention relates generally to the field of cleansing the interior surfaces of enclosures, more particularly to cleansing the interior surfaces of substantially vertical longitudinal enclosures, and specifically to degreasing the interior surfaces of kitchen exhaust ducts of the type most commonly fed by intake hoods most commonly disposed above stoves.

2. General Background

The use of oils in cooking commonly results in air borne grease and smoke which is commonly vented out of restaurant kitchens with an intake hood and exhaust duct through which the grease and smoke laden air is induced by means of a fan and expelled outside to the ambient atmosphere exterior to the building in which the kitchen is located. This practice is important for sanitary and safety considerations among other factors such as the reduction of offensive odors. If airborne grease is not vented out of the kitchen it will readily result in a conflagration which will readily destroy the kitchen if not the entire building in which the kitchen is located.

The airborne grease, however, in being vented out of the kitchen through a duct, commonly accumulates upon the interior surfaces of the duct walls and creates a fire hazard there, particularly if the duct is connected to an intake hood above a stove which is perhaps the most common arrangement known. In recognition of this fire hazard it is a commonplace in the United States to require periodic degreasing of the interior surfaces of these ducts as a matter of fire code regulation. Restaurants commonly known as fast food franchises are particularly subject to rather frequent degreasing of their kitchen exhaust ducts because of the large volume of airborne grease carried therethrough over time and the high rate of grease accumulation resulting therefrom. Quarterly, monthly, fortnightly and even more frequent periodic degreasings are commonly mandated by state regulations for the interior surfaces of the ducting in many restaurant kitchen ventilation exhaust systems in order to avoid the dangerous fire hazard which would otherwise result.

The current method of degreasing restaurant kitchen exhaust ducts is highly labor intensive. It involves the transport of high pressure nozzles upon hoses several stories high in many instances, opening lateral hatches to the ducts at various elevations, and hand directing the highly pressurized and heated jet of water and steam from the nozzle against the interior walls of the duct. The work is extremely uncomfortable for many reasons including heat, elevated humidity, cramped quarters, and weighty apparatus. Visibility inside the duct is minimal and communication between team members impeded by the structure necessarily interposed between the person wielding a nozzle and the person controlling the pump. The present inventor is thoroughly knowledgeable of this work and has and has had many employees who will readily attest to the arduousness of this work.

The water used in this operation is commonly collected with plastic sheeting disposed beneath the bottom end of the duct, typically disposed under an intake hood and above a stove, and directed into buckets disposed upon the floor of the kitchen and subsequently poured down a drain. The expense involved with this operation is considerable because of the difficulty of the labor involved, because of the expense of the equipment required, and because of the fact both must be transported on site periodically. And the effectiveness of this operation, being wholly dependent upon the people directing the pressurized jets of heated water and steam in conditions of minimal visibility, is open to question. It is effective if properly executed but there is no known manner of ascertaining the level of cleansing achieved nor of confirming that the operation was properly executed.

Discussion of the Prior Art

The prior art considered most pertinent to the present innovation is characterized by a housing variously deflecting the air stream therethrough and possessing water jet nozzles intended for capturing the airborne oil or grease particles in a mist or fog which will carry the grease particles to a drain located within the housing. U.S. Pat. No. 3,786,739 for a 'Ventilating System' invented by John David Wright and assigned to Industrial Industries, Inc. of Houston, Tex. issued 22 Jan. 1974 discloses such a system:

> for venting air laden with moisture, smoke, fumes, grease vapors and the like from . . . kitchen areas . . . adapted to periodically undergo a wash cycle to clean practically the entire system (which) includes a housing, a hood, a first chamber in the lower portion . . . a first series of nozzles for imparting an extraction spray . . . and a series of nozzles for imparting wash liquid to both chambers within the housing. (ABSTRACT)

A second similar disclosure was made in U.S. Pat. No. 5,042,457 issued 27 Aug. 1991 to Arien W. Gallagher for a 'Grease Extraction Ventilator Apparatus' which "includes an outer housing including a lower entrance passage and an upper exit duct for drawing the exhaust air stream upwardly through a scrubbing chamber, and a water supply manifold (which) directs the water into the exhaust stream . . . in such a way as to create a vortex of water droplets". (ABSTRACT) A drain is also provided which is inferior in elevation to the air inlet in a manner similar to the disclosure of Wright as is a plurality of nozzles which are attached directly to interior surfaces of the structure comprising the housing. Rather than baffles the lower interior of the housing presents a switchback conduit with angled flanges on the edges of the wall dividing the passageway in order to achieve the vortex.

A third disclosure of similar approach to the problem addressed is found in U.S. Pat. No. 3,770,061 issued 6 Nov., 1973 to Trenton O. Hall for an 'Air Scrubber Apparatus With Improved Fire Extinguishing Means'. A substantially vertical interior passage is described, the lower portion containing a series of baffles, of which one is medial to two others and has a nozzle producing a fine spray attached proximate its end. The purpose of this nozzle, as in the two disclosures discussed above, is to produce a fine mist or fog to trap airborne grease particles and to cool the air stream. "The nozzle 30 is preferably constructed so that a fog blanket of spray is discharged." (Column 3, lines 47–48) This spray is also preferably directed against the interior walls of the housing for cleansing, an object considered inimical to that of a fog. A second nozzle, superior in elevation to the first, is connected to a chemical supply and is intended to extinguish fires in the housing. This key element is considered eloquent testimony to the failure of the general approach of using a water mist or fog to capture grease particles in preventing the creation of a fire hazard in a housing used for kitchen exhaust.

A fourth disclosure utilizing an appreciably different approach for control of grease accumulation is found in two U.S. Patents both issued to Edward B. Vandas and assigned to McGraw-Edison Company, U.S. Pat. No. 4,022,118 & No. 4,066,064, the former for a 'Kitchen Ventilator Grease Extractor Construction', the latter for a 'Kitchen Ventilator Damper Actuator and Control'. The air flow in these disclosures is induced through a "tortuous path defining extractor structure" (U.S. Pat. No. 4,022,118 ABSTRACT) of particularized configuration which includes baffles. Nozzles are used not to create a mist or fog but to clean the interior surfaces of the walls defining the convoluted passageway which is also configured to collect the resulting effluent and direct the same down a drain as is common to the other disclosures discussed above. The "tortuous path" is intended to centrifugally force the entrained grease particles against the baffles which are then washed off therefrom by high pressure spray.

A fifth disclosure addressing the same basic problem addressed by the present invention utilizes a bath which is impinged by the air stream causing "agitation, atomization and turbulence for mixing and removal of foreign matter from the air which then turns and moves through the cleansing chamber" (ABSTRACT) which apparently cleanses the air by static pressure which is regulated by the level of the water bath.

Lastly a disclosure which does not address the same problem addressed by the present invention or the references discussed above but which fits into the broad category of cleaning the solid interior walls of an enclosure with fluid is found in U.S. Pat. No. 5,009,715 issued 23 Apr. 1991 to R. E. Wilson for a 'Method For Preventing Deterioration of Concrete Pipe'. The ABSTRACT for this patent reads as follows:

> A method and apparatus for cleansing the upper interior surfaces of a concrete sewer conduit, the apparatus including the concrete sewer conduit and a plurality of spray nozzles spaced apart and adapted to be introduced into and is posed in and along a length of concrete sewer to enable continuous or intermittent spraying of the upper interior surface or, alternatively, to be permanently mounted along the length of the concrete sewer conduit when newly constructed.

This reference is only included because of its classification and the structure disclosed.

Statement of Need

As discussed in the subsection above entitled 'General Background' it is currently common practice to clean and degrease the interior surfaces of restaurant kitchen exhaust ducts on a regular basis because state regulations require this out of concern for the fire hazard otherwise posed by these structures. This fact alone testifies to the failure of all the references discussed immediately above to solve a problem of magnitude and severity sufficient to be strictly regulated by the state. The question posed by this recognition is why these systems failed to solve this problem. It is considered that the general approach of using a mist or fog to capture the airborne grease or oil particles is perhaps ultimately ineffective in preventing the accumulation of grease upon interior surfaces contacted by the exhaust and by the fog or mist produced thought this approach undoubtedly was effective in directing grease down a drain which would otherwise would have been vented out of the kitchen to the exterior of the building. In short, this approach reduced the exhaust of grease but didn't prevent the accumulation of grease upon the interior surfaces in contact with the exhaust.

The second approach, disclosed by Vandas, of forcing the grease laden air against baffle surfaces and directing high pressure water jets against these surfaces in order to remove the grease and send it down a drain is considered markedly different from that of employing a fog or mist to capture the grease particles. Yet this approach was also, apparently, ineffective in preventing grease accumulation upon the interior surfaces of the ventilation system, despite the fact that the state mandated method for dispelling this fire hazard is quite similar: direct high pressure water jets against the interior surfaces of the ducting comprising the vent. It is suggested that the difference between the disclosure of Vandas and the currently mandated method of cleansing consists of the areas involved.

The disclosure of Vandas, and of the other four references discussed above addressing this same problem, all attempt to remove grease from the air stream in a housing which is inferior in elevation to some length of ducting in which a fan is disposed and through which the air is actually exhausted. It is considered that the previous attempts at solving this same problem discussed above which is fully representative of the known prior art pertinent to the present invention all failed in a matter of degree in that none were effective in removing all of the grease particles from the air being exhausted and therefore some grease would always be carried by the inducted air stream through the duct above the housing for these systems and the interior surfaces of the ducting above would, regardless of how clean the interior surfaces of the housing were maintained, become coated with grease and pose a fire hazard.

Otherwise it is considered that the systems described in the prior art addressing this problem were inconvenient to the operators of restaurant kitchens. The creation of a continuous fog or mist above a stove might be considered a nuisance to cooking. And the direction of high pressure water spray upon interior surfaces of a housing directly above a stove while cooking might pose a similar inconvenience. But if these measures were not continuously applied then obviously these measures would be wholly ineffective in preventing the travel of airborne grease through and coming into contact with the interior surfaces of the ventilation structure and from accumulating upon all such surfaces superior in elevation to the housings.

It is hence considered that a need therefore exists for an effective approach to the problem of grease accumulation upon the interior surfaces of restaurant kitchen exhaust ducting. The lower vent portion including the intake hood is readily cleaned because these surfaces are readily accessible from the kitchen. It is the upper interior surfaces which are relatively inaccessible and which pose what is considered to be poignant need for a system which will ensure that grease accumulation upon the interior surfaces of kitchen exhaust ducting does not pose a fire hazard which is easier, less expensive, and more reliable than the current procedure.

SUMMARY OF THE INVENTION

Objects of the Present Invention

The encompassing object of the present invention is the provision of a means for effectively degreasing the interior surfaces of the ducting of a restaurant kitchen exhaust ventilation system.

An ancillary object of the present invention is the provision of a means for effectively degreasing the interior surfaces of a restaurant kitchen exhaust ventilation system which does not need to be operated continuously to be effective.

A second ancillary object of the present invention is the provision of a means for effectively degreasing the interior surfaces of the existing ducting of a restaurant kitchen exhaust ventilation system.

A third ancillary object of the present invention is the provision of a means for effectively degreasing the interior surfaces of the ducting of a restaurant kitchen exhaust ventilation system which does not require a drain.

An auxiliary object of the present invention is the provision of a means for effectively degreasing the interior surfaces of the ducting of a restaurant kitchen exhaust ventilation system which is requires less labor than degreasing with hand held equipment.

A second auxiliary object of the present invention is the provision of a means for effectively degreasing the interior surfaces of the ducting of a restaurant kitchen exhaust ventilation system which requires less time than periodic degreasing with hand held equipment.

A third auxiliary object of the present invention is the provision of a means for effectively degreasing the interior surfaces of the ducting of a restaurant kitchen exhaust ventilation system which is less expensive in operation than periodic degreasing with hand held equipment.

A fourth auxiliary object of the present invention is the provision of a means for effectively degreasing the interior surfaces of the ducting of a restaurant kitchen exhaust ventilation system which provides greater assurance of effective degreasing of said surfaces than degreasing with hand held equipment.

Principles Relating to the Present Invention

In order to achieve the objectives stated above it is considered that a substantially stationary high pressure fluid system utilizing a plurality of nozzles capable of directing a high velocity fluid stream upon the interior surfaces of the ducting of an existing conventional kitchen exhaust vent located within said ducting which may be operated at a time of convenience is indicated. Such a system is preferably operable at convenient intervals for a relatively brief length of time, as opposed to a system which must be run continuously during normal kitchen operation, and require minimal labor with the effluent resulting from operation of the degreasing operation being readily collected and disposed down an existing drain.

In order for a high pressure fluid system to be comprehensive of a relatively great length of ducting which further possesses a large rise in elevation over that length it is considered desirable that the nozzles be selectively operable according to elevation so that the pump required for the system need not supply all nozzles at once. The pump is the single most expensive component of the system and in order for the system to be economic for a lengthy ductwork with a relatively large rise in elevation it would be prohibitively expensive to supply all the nozzles in the system simultaneously.

In recognition of the elevational rise involved and the influence of gravity upon fluid it is recommended that the uppermost nozzles be opened first under full operating pressure and that the supply to these nozzles be shut in coordination with the opening of the next lower level of nozzles and that this procedure be continued down the system to effect a rolling cascade of high velocity fluid directed against the interior surfaces of the duct walls from top to bottom. This deployment will also minimize operation time in giving the fluid at the highest elevation the longest time to descend under the influence of gravity.

It is also considered, in regard to fluid discharge, that a damper located proximate the bottom of the ducting which is substantially water tight and which possesses a fitting for a length of conduit would provide a further convenience. With the damper closed during operation and the length of conduit attached to the fitting the resulting effluent may readily be directed to a suitable receptacle during degreasing.

In order to degrease the interior surface of an existing conventional kitchen exhaust vent duct it is considered that a plurality of nozzles directing the high velocity fluid each be operably connected to a length of piping longitudinally disposed within the ducting by a framework which is readily located inside and attachable to existing ductwork. Since conventional ductwork is typically characterized by either a substantially circular or a substantially rectangular extension possessing either one continuous cylindrical or four substantially parallel walls it is considered that fixed nozzles utilized in groups of four nozzles all possessing a similar elevation and each directed upon one of the interior surfaces of the four walls for a rectangular duct be utilized and that three nozzles upon a similar elevation is perhaps ideal for circular ducting.

A stationary frame work and supply means possessing a plurality of nozzles attached at appropriate intervals along the length of the duct is hence described as capable of directing a high velocity fluid stream against substantially all of the interior surfaces of a conventional duct. Fluid pressurization is achieved with a pump and control of the system is dependent upon operation of the pump, upon valve means, and preferably upon selective nozzle operation by elevation. A programmable controller and electrically operated valves for the nozzles is considered ideal. A pressure of over two thousand pounds per square inch is recommended. The fluid is also preferably elevated in temperature above two hundred fifty degrees Fahrenheit and while plain water is considered a satisfactory fluid detergent or other suitable agents added to the water may additionally be considered desirable.

Attachment of the framework locating the supply piping longitudinally within the interior of the duct may be effected by any suitable means. Welds, screws, bolts and nuts, spikes or friction achieved with rigid frame members forced into a compressive state when brought into position against the interior surface of the duct, substantially normal the longitudinal axis of the duct or inclined upward from the duct walls to the piping, are all considered examples of adequate attachment means. The ability to modify the effective length of the frame members may also facilitate installation. A combination of these means is also considered attractive. Flexible support members under tension and inclined downward from the duct to the piping supported thereby is also considered feasible if suitable anchorage is available.

Particulars relevant in the application of these principles in achievement of the objects cited above may become readily apparent with a reading of the detailed discussion of the preferred embodiments found following especially if made with reference to the drawings attached hereto and described briefly immediately below.

BRIEF DESCRIPTION OF THE DRAWINGS

FIG. 4 is an isometric view of a portion of a preferred embodiment of the principles relating to the present invention depicting in detail a cluster of nozzles attached to longitudinally disposed piping within proximate elevation and framework providing attachment to length of a rectangular ducting partially cut away in exposure.

DETAILED DESCRIPTION OF A PREFERRED EMBODIMENT

Figure 1:
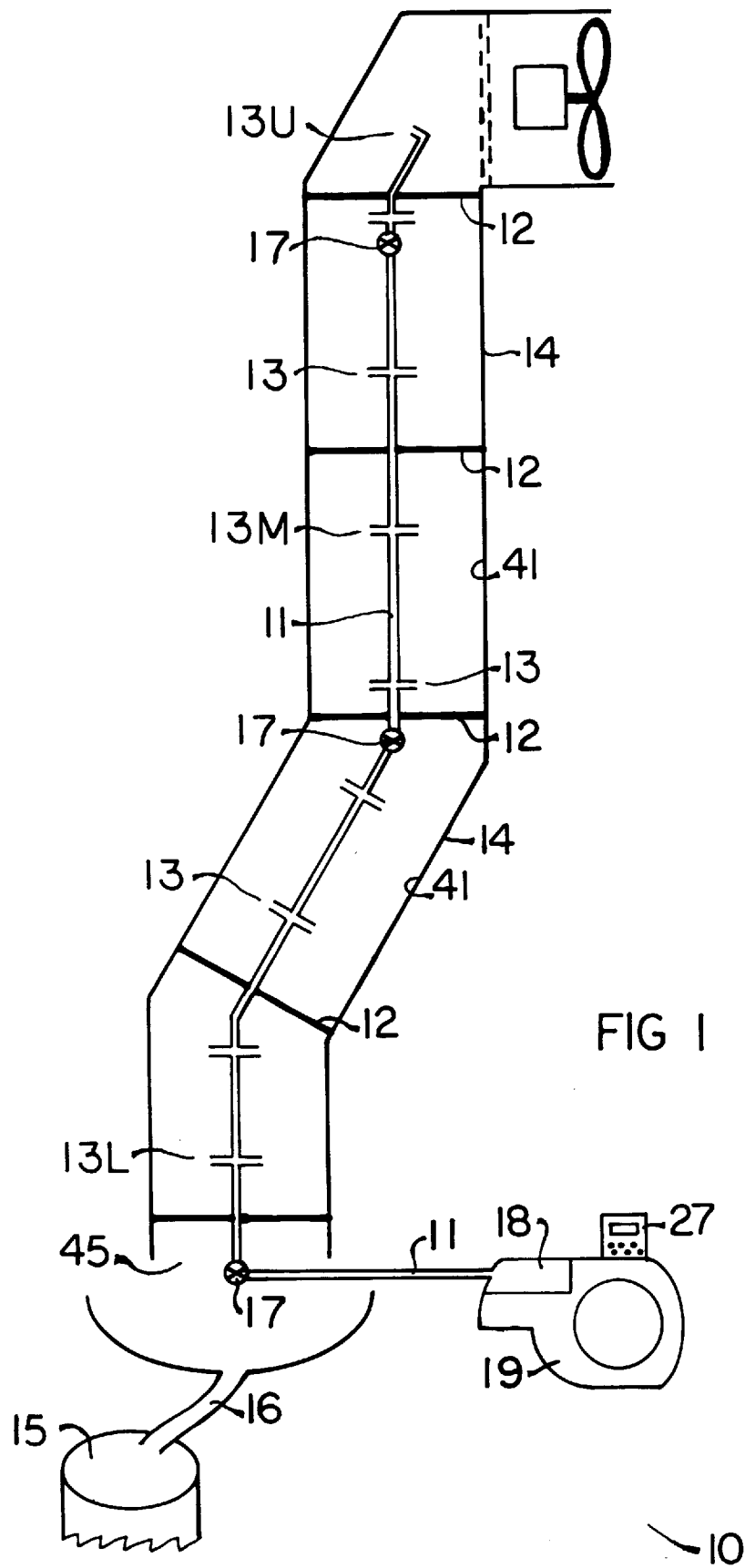
FIG. 1 is plain elevational view taken from the side of a preferred embodiment of the principles according to the present invention installed in a generic kitchen exhaust ventilation duct which is shown cut away in medial cross section to expose all the components installed therein as an integral system.

With reference to FIG. 1 an integral generic degreasing system 10 depicting a preferred embodiment in accordance with the principles relating to the present invention is seen to have a length of piping 11 supported by a framework 12 and possessing a plurality of nozzle means 13 connected thereto disposed longitudinally within kitchen exhaust ventilation ducting 14 of which the lower end 45 is connected to disposal means 15 by means of an effluent conduit 16.

Pressurized fluid supply to the nozzle means 13 via the piping 11 is controlled by valve means 17 and is supplied by a high pressure pump 19 which also includes heating means 18. In a preferred embodiment of the principles relating to the present invention the nozzle means 13 are operated selectively so that only a fraction of the nozzle means 13 connected to the piping 11 are operative for a time in order to minimize the operative capacity of the pump 19 and the expense of the same required.

Pressure capabilities of about three thousand pounds per inch (psi) or higher are considered desirable in accordance with conventional practice wherein pressure of three thousand psi is routine and pressure of six thousand psi is well known in manually operated equipment. Also in accordance with conventional practices it is preferred that the fluid possess a temperature in the range of two hundred fifty to two hundred eighty degrees Fahrenheit which is a commonplace currently for equipment used manually, so the fluid stream 30, clearly seen in FIGS. 3 & 4, directed by a nozzle 33 against the interior surface 20 of the ducting 40, is at least partially gaseous, or steam if the fluid utilized is water, which is recommended.

In thermodynamic terms the fluid is preferably superheated. The advantages obtained in degreasing if the fluid stream 30 is superheated are well known. The point, however, is that pumps capable of delivering superheated fluid at a superior elevational head, such as is the case in the preferred embodiment of the principles relating to the present invention, are relatively expensive and the rate of fluid volume delivered is a constraint which is determinative of capacity and expense given other equivalent thermodynamic characteristics; force being a product of the mass and half the square of velocity: Force=(mass)(velocity$^2$/2) as is well known.

Consequently, the effectiveness of the fluid stream 30 in degreasing a solid surface is determined largely by the velocity of the fluid stream 30 whereas the expense of the pump 19 required in a preferred embodiment of the principles relating to the present invention is determined largely by the volume rate of flow capacity which it is therefore desirable to minimize. In order to facilitate this objective a preferred embodiment of the principles relating to the present invention possesses selective control of the nozzle means 13 as mentioned above so that only a portion of the whole system is operative at a given time.

Figure 2:
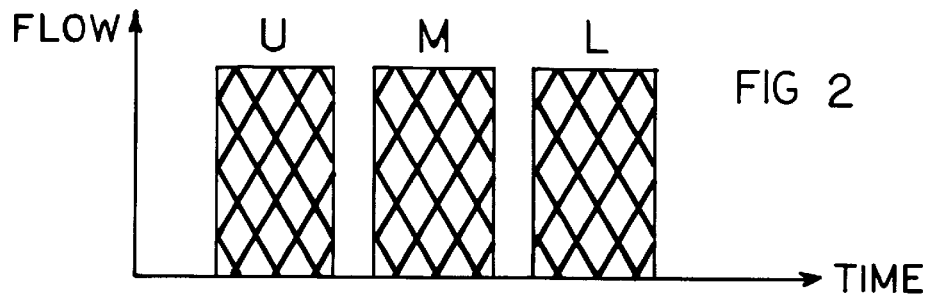
FIG. 2 is a schematic of the preferred sequence of operation for all of the operative components of the preferred embodiment of the principles according to the present invention depicted in FIG. 1.

The selective control of the nozzle means 13 is further preferably determined by a valve means controller 27 to provide sequential control whereby the nozzle means 13 are operated in accordance with elevation. A preferred sequence obtains a cascade from top to bottom of the interior surface 41 of the ducting 14 as represented in FIG. 2 wherein upper nozzle means 13$u$ are operational first, medial nozzle means 13$m$ are operated next and lower nozzle means 13$l$ are operated last. The result is a descending cascade of fluid stream 30 against the interior surface 41 of the ducting 14 which is considered optimal with regard to fluid use in degreasing the structure addressed.

Figure 3:
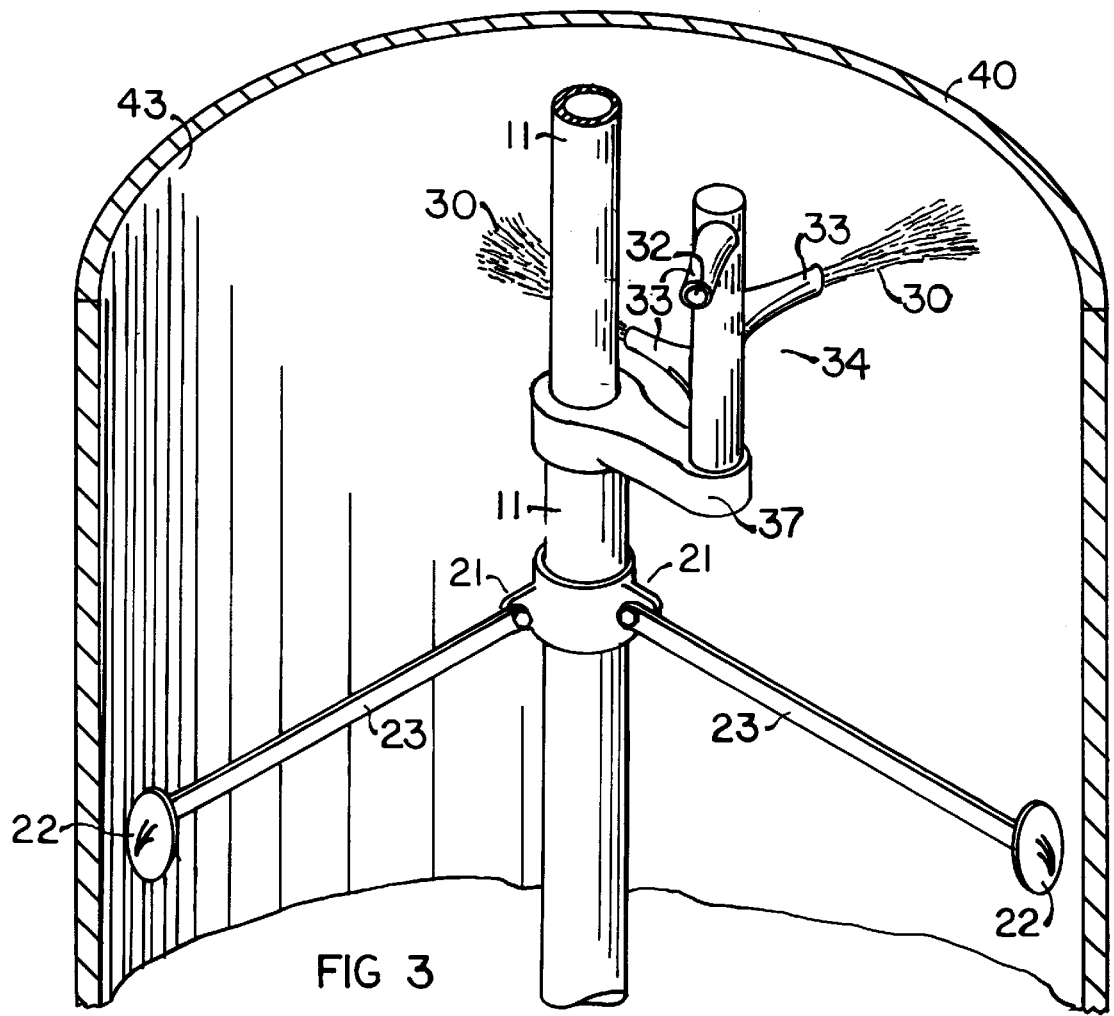
FIG. 3 is an isometric view of a portion of a preferred embodiment of the principles relating to the present invention depicting in detail a cluster of nozzles attached to longitudinally disposed piping within proximate elevation and framework providing attachment to a length of cylindrical ducting partially cut away in exposure.

Two types of ducting 14 are most commonly utilized in kitchen exhaust ventilation: cylindrical and rectangular. The difference between the two with regard to the principles relating to the present invention concerns the ducting wall attachment means 22 of the framework 12 to the ducting wall 40. As seen in FIG. 3, a cylindrical ducting interior surface 43 is addressed and the framework 12 is provided by rigid, non-extensible, frame members 23 to support the piping 11 and position the nozzles 33 within the ducting 14. The rigid, non-extensible, frame members 23 depicted therein also possess an inclination upward from the ducting attachment means 22 to the piping attachment means 21. It is considered that if each rigid, non-extensible, frame member 23 is pivoted or otherwise allowed to possess varying inclination downward and outward from the piping attachment means 21 installation is facilitated by decreasing the inclination in upward displacement of each rigid, non-extensible, frame member upon a proximate elevation until contact with the cylindrical ducting interior wall 43 is achieved and each rigid, non-extensible, frame member 23 is brought into a state of compression.

With each rigid, non-extensible member 23 in a sufficiently compressive state, which is the case depicted in FIG. 3, the frictional contact between each and the cylindrical duct interior surface 43 may be sufficient as a ducting wall attachment means 22 though other, additional duct wall attachment means 22 may be considered desirable. Additional duct wall attachment means 22 may be effected by conventional methods such as drilling a hole through the ducting wall 40 and threading a screw through an aperture through the portion of the rigid, non-extensible frame member 23 brought into contact with the cylindrical duct interior surface 43 and the hole drilled through the duct wall 40 so that engagement with the same may be effected.

In this case it is noted that engagement of the screw with the sides of the aperture through the portion of the rigid, non-extensible, member 23 in contact with the cylindrical duct interior surface 43 is not desired and hence it is advised that this aperture exceed in diameter the thread diameter of the screw but not that of the screw head, of course, while the hole drilled through the duct wall 40 is preferably equal to the root diameter of the screw. And rather than a screw, so long as the exterior of the duct wall 40 is accessible, a bolt and nut may be used in which case the hole drilled through the duct wall 40 is, as is the aperture through the portion of the rigid, non-extensible, member 23 in contact with the cylindrical duct interior surface 43, slightly greater than the thread diameter of the bolt but less than the effective diameter of the bolt head and the nut utilized.

A third ducting wall attachment means 22 additional to the frictional contact between a rigid, non-extensible, member 23 in a compressive state and the cylindrical duct interior surface 43 which is considered satisfactory is welding. A fourth such ducting wall attachment means 22 is use of epoxy adhesive which is formulated for attachment to galvanized steel sheet which comprises the material from which ducting is invariably constructed. A fifth ducting wall attachment means 22 additional to the frictional contact between a rigid, non-extensible, member 23 in a compressive state and the cylindrical duct interior surface 43 which is the case depicted in FIG. 3 is the use of a spike oriented to penetrate the duct wall 40 when brought into a sufficiently compressive state. With the inclination of each rigid, non-extensible, frame member 23 depicted in FIG. 3 gravity will maintain the spike in place.

A rectangular duct interior surface 44 is depicted in FIG. 4 with a framework 12 comprised of rigid, extensible, members 24 possessing piping attachment means 21 and ducting wall attachment means 22. As clearly seen the rigid, extensible, members 24 depicted herein are substantially perpendicular to both the rectangular ducting interior surfaces 44 and the piping 11 supported thereby. Though unapparent each rigid, extensible, member 24 depicted in FIG. 4 is further in a state of compression effected by extension of each rigid, extensible, member 24 in place. The preferred means of extension is comprised of threading wherein one portion of each rigid, extensible, member 24 possesses external threading which mates with the internal threading of the other portion which resembles a sleeve. One portion must be rotatable about a common longitudinal axis in engagement with the other portion.

It is commented that the substantially perpendicular disposition of each rigid, extensible, member 24 with regard to the rectangular ducting interior surfaces 44 depicted in FIG. 4 is considered a limiting case for use of rigid frame members 23, 24 with the inclination depicted in FIG. 3 regarded as positive and that in FIG. 4 as zero whereby any negative inclination would no longer have the rigid frame member 23, 24 in a compressive state. Due to the weight of the piping 11 and nozzles 33 connected thereto a negative inclination in this sense would necessarily result in each rigid frame member 23, 24 so disposed to be in a state of tension in which frictional contact between the rigid frame member 23, 24 and the duct interior surface 41, 43, 44 would no longer exist and hence no longer be of any use to the framework 12.

In a state of tension rigidity is no longer required and flexible frame members 20 such as steel cable could readily provide adequate support and location of the piping 11 and connected nozzle means 13 to and with the ducting 14 if satisfactory anchors can be found for the ducting wall attachment means 22. Ducting is invariably fabricated from galvanized steel sheet, as earlier mentioned, and for this reason a tension system is not favored because the required anchors are considered problematic. If, however, the location of wood studs is known exteriorly adjacent to the ducting 14 into which a hook can be screwed then tension will work and flexible frame members 20, such as steel cable, may readily be utilized and the inclination of these flexible frame members 20 with respect to the duct interior surface 40 will be negative.

With regard to the piping attachment means 21 possessed by the framework 12 in support and longitudinal disposition of the piping 11 within the ducting 14 the attachment must be of sufficient strength to support the weight of the piping 11 and the plurality of nozzles 33 connected thereto and to maintain the desired disposition of the same. In general a rigid attachment is preferred and any suitable means of effecting the attachment is considered to fulfill the principles relating to the present invention with regard to this aspect. Examples of suitable attachment include the use of bolts and nuts through appropriate apertures in a portion of the frame member 20 which encircles the piping 11, use of a clamp end upon the frame member 20 which grips the piping 11 and which is preferably tightened with a bolt passed through one portion of the clamp and threaded into an opposed portion of the same, use of a bolt and nut passed through an aperture proximate the end of the frame member 20 and an aperture through a projecting portion of a collar secured to the piping 11. It is generally preferred also that the piping attachment means 21 allow pivoting of the frame member 20 during installation for reasons earlier described and that tightening to effect an rigid and immobile attachment of the frame member 20 to the piping 11 be allowed after the ducting wall attachment means 22 of the frame member 20 to the ducting wall 40 is effected. It is for this reason that the use of a bolt and nut in the various examples offered is utilized.

It is understood that while each cluster of nozzles of proximate elevation 34 is comprised of a plurality of nozzles 33 and only one such cluster 34 is depicted in each of FIGS. 3 & 4, a plurality of such nozzle clusters of proximate elevation 34 may be utilized in one system. Certain differences between the portion of the embodiment of the principles relating to the present invention depicted in FIG. 3 and a similar portion depicted in FIG. 4 are observed as being the result of the ducting 14 addressed in each case: a cylindrical duct interior surface 43 in FIG. 3 and a rectangular duct interior surface 44 in FIG. 4. In each figure a nozzle cluster of proximate elevation 34 is seen. In FIG. 3 this nozzle cluster 34 is comprised of three nozzles 33 each upon a different but proximate elevation to each other. Three nozzles 33 is preferred in the case of a cylindrical interior surface 43 as providing effective degreasing of the entire section of ducting 14 addressed with a minimum number of nozzles 33.

The nozzle cluster of proximate elevation 34 depicted in FIG. 4 is seen to be comprised of two pairs of opposed nozzles 33 each upon a separate but proximate elevation. Since a rectangular duct interior surface 41 having four contiguous faces is addressed in this case four nozzles 33 is considered best for obvious reasons. As suggested by the pairing of nozzles 33 in this case and the use of three separate elevations for each nozzle 33 as seen in FIG. 3 it is observed that while a plurality of nozzle clusters of proximate elevation 34 within the ducting 14 is preferred, particularly in order to achieve the selective operational sequence from top to bottom described earlier with reference to FIG. 2, all the nozzles 13 in a nozzle cluster of proximate elevation 34 may have the same elevation and nozzle clusters of proximate elevation 34 may be omitted altogether in fulfillment of the principles relating to the present invention.

Selective operation of the nozzle means 13 need not proceed by nozzle clusters of proximate elevation 34 but may proceed on the basis of individual nozzles 33 and the plurality of nozzles 33 utilized may be given equidistant spacing if desired, in a helical arrangement, perhaps, which would yield excellent results in degreasing a cylindrical duct interior surface which is considered the most common. If the selective operation of the nozzle means 13 is to proceed by nozzle clusters of proximate elevation 34 it is recommended that the valve means 17 include nozzle cluster valves 37 and that these be controlled by a valve means controller 27. It is further recommended that the nozzle cluster valves 37 be of a solenoid or any other type which is electrically controllable and that the valve means controller 27 be comprised of a programmable controller.

As depicted in both FIGS. 3 & 4, a separate nozzle cluster valve 37 is associated with each nozzle cluster of proximate elevation 34. In FIG. 3 the nozzle cluster valve supports a column from which each of three nozzles 33 extend outward while in FIG. 4 two nozzle cluster valves 37 each have two nozzles 33 extending outward directly. In both cases the piping 11 extends upward aside the nozzle cluster valves 34. If the cluster of nozzles of proximate elevation concerned was uppermost in a given system the nozzle cluster valve 37 associated with the same might be placed directly in line with the piping 11 since supply further upward is unnecessary. In the case of individual nozzles 33 being operated each with a separate valve 27 it is recommended that the valve 27 be disposed alongside the piping 11, connected thereto and to the nozzle 33 directly, in a manner similar to that depicted in FIG. 4 though two nozzles 33 are shown extending off one nozzle cluster valve 37.

In any case the effluent resulting from operation must be removed from the lower end 45 of the ducting 14 and several different approaches to this aspect are considered. A damper which is operated by a motor located at the lower end 45 of the ducting 14 might be utilized with the damper further possessing a fitting to which the upper end of a hose could be attached. The lower end of this hose could be connected to a vacuum. The damper, fitting, hose and vacuum operatively connected in this manner comprises what is considered to be an automatic or fully electro-mechanized effluent conduit 16. It is considered the fastest and most convenient effluent conduit 16 known and preferred for this reason.

Alternatively an effluent conduit 16 might be comprised of a manually disposed damper located at the lower end 45 of the ducting 14 having the top end of a hose integrally attached thereto with the lower end disposed above a drain. In this case and the previous case the damper preferably provides a watertight seal of the lower end 45 of the ducting 14. And, in each case, a hose is used with the damper in order to convey effluent.

The hose is detachable from the damper in the first case, however, and a fitting upon the damper provided for removable attachment of a hose to the same. This is desirable because the damper in this case is closed and opened by a motor and the damper is installed as a part of the degreasing system 10. The damper in the second case is manually located at the lower end 45 of the ducting 14 and may therefore have one end of a hose permanently attached thereto as depicted or removable as in the previous case. The other end of this hose, which in the second case is simply placed above a drain, could be attached to a vacuum as in the second case, and the lower end of the hose attached to a vacuum could simply be located above a drain as in the second case.

It is further considered that an effluent conduit 16 does need not to possess a damper or hose but may merely consist of any means capable of directing effluent resulting from operation of the degreasing system 10 into a suitable means of disposal 15 which may consist of a pail and the effluent conduit 16 of a piece of sheeting which may in one case, be flexible and suspended beneath a exhaust hood above which is typically located the lower end 45 of the ducting 14. The sheeting might be rigid, fabricated from galvanized steel sheet left over from fabrication of the ducting 14, for instance, or any suitable material. The flexible sheeting might be of plastic, canvas, or any other suitable material. Suspension might be effected by people holding the sheeting. Forming of the sheeting into a channel which directs the effluent to the open mouth of a drain or container such as a pail is suggested for obvious reasons.

The foregoing is intended to describe the preferred embodiment of the principles relating to the present invention in such detail as to enable one practiced in the art to make and use the same in what is considered to be the best manner known and is not intended in any manner to be restrictive of the scope of the invention secured by Letter Patent for which

I claim:

1. A system comprising:

a length of kitchen exhaust ventilation ducting possessing an open lower end, an interior surface, and a substantial and continuous rise in elevation from said lower open end;

piping means for conveyance of water under high pressure;

a plurality of nozzle means for delivering a high velocity water stream;

framework means for attaching said piping means interiorly to said ducting;

selective valve means for controlling the supply of water through said piping means to each of said plurality of nozzle means;

and a high pressure pump operably connected to said piping means capable, in operation, of supplying said piping means with water under high pressure;

said piping means being capable of conveying water under high pressure from said high pressure pump to each of said plurality of nozzle means through said selective valve means;

each of said plurality of nozzle means possessing at least one nozzle operably connected to said piping means, which, supplied with water by said high pressure pump, delivers a high velocity water stream capable of removing grease adhered to a solid surface impinged by said high velocity water stream;

said framework means comprising a plurality of framework members each possessing ducting attachment means enabling attachment of said framework member to said ducting and further possessing piping attachment means enabling attachment of said framework member to said piping means;

said selective valve means enabling predetermined supply of water under high pressure from said high pressure pump through said piping means to any one of said plurality of nozzle means operably connected to said piping means;

said framework means longitudinally disposing said piping means within said length of kitchen exhaust ventilation ducting, positioning each of said plurality of nozzle means operably connected to said piping means such that each said nozzle means can deliver a high velocity water stream directed against a portion of said interior surface of said ducting as determined by operation of said selective valve means;

whereby delivery of a high velocity water stream through said plurality of nozzle means, as determined by said selective valve means, against a sufficient plurality of portions of said interior surface of said ducting effects removal of grease from said interior surface and the influence of gravity, in combination with the substantial and continuous rise in elevation of said ducting, causes a resulting effluent comprised of water and grease to descend to said open lower end of said length of ducting from which said effluent may be readily collected and disposed of as desired.

2. A system in accordance with claim 1 wherein each of said plurality of nozzle means is comprised of a nozzle cluster comprised of a plurality of nozzles each possessing an elevation proximate each other.

3. A system in accordance with claim 2 wherein each said nozzle cluster is comprised of three nozzles.

4. A system in accordance with claim 2 wherein each said nozzle cluster is comprised of four nozzles.

5. A system in accordance with claim 1 wherein the operation of each of said plurality of nozzle means determined by operation of said selective valve means comprises a sequence commencing with operation of an upper nozzle means comprising one of said plurality of nozzle means possessing an elevation superior to other of said plurality of nozzle means, proceeding with operation of a medial nozzle means comprising one of said plurality of nozzle means possessing an elevation inferior to said upper nozzle means, and concluding with operation of a lower nozzle means comprising one of said plurality of nozzle means possessing an elevation inferior to said medial nozzle means.

6. A system in accordance with claim 1 wherein said selective valve means includes a separate valve associated with each of said plurality of nozzle means.

7. A system in accordance with claim 6 wherein each said separate valve associated with each of said plurality of nozzle means is electrically operated and said selective valve means further includes a programmable controller through which each said separate valve associated with each of said plurality of nozzle means is electrically controlled.

8. A system in accordance with claim 7 wherein operation of each of said plurality of nozzle means comprises a sequence commencing with operation of an upper nozzle means comprising one of said plurality of nozzle means possessing an elevation superior to other of said plurality of nozzle means, proceeding with operation of a medial nozzle means comprising one of said plurality of nozzle means possessing an elevation inferior to said upper nozzle means, and concluding with operation of a lower nozzle means comprising one of said plurality of nozzle means possessing an elevation inferior to said medial nozzle means.

9. A system in accordance with claim 7 wherein each said nozzle means is comprised of a nozzle cluster each comprised of a plurality of nozzles each possessing an elevation proximate each other.

10. A system in accordance with claim 9 wherein each said nozzle cluster is comprised of three nozzles.

11. A system in accordance with claim 9 wherein each said nozzle cluster is comprised of four nozzles.

12. A system in accordance with claim 1 wherein each said frame member is substantially rigid.

13. A system in accordance with claim 12 wherein each said frame member possesses a positive inclination from said ducting wall attachment means to said piping attachment means under appropriate longitudinal disposition of said piping means within said ducting.

14. A system in accordance with claim 12 wherein each said frame member is extensible.

15. A system in accordance with claim 12 wherein each said frame member is non-extensible.

\* \* \* \* \*